(12) United States Patent
Lail

(10) Patent No.: US 6,574,400 B1
(45) Date of Patent: Jun. 3, 2003

(54) FIBER OPTIC CABLE WITH WATER BLOCKING FEATURES

(75) Inventor: Jason C. Lail, Hickory, NC (US)

(73) Assignee: Corning Cable Systems LLC, Hickory, NC (US)

(*) Notice: Subject to any disclaimer, the term of this patent is extended or adjusted under 35 U.S.C. 154(b) by 0 days.

(21) Appl. No.: 09/048,486

(22) Filed: Mar. 26, 1998

(51) Int. Cl.⁷ .................................................. G02B 6/44
(52) U.S. Cl. ...................... 385/109; 385/100; 385/102; 385/106
(58) Field of Search ......................... 385/100, 104–106, 385/109–113

(56) References Cited

U.S. PATENT DOCUMENTS

| 4,241,979 A | 12/1980 | Gagen et al. ................ 385/107 |
| 4,381,140 A | 4/1983 | Van der Hoek et al. .... 385/104 |
| 4,389,088 A * | 6/1983 | Trezequet ................... 385/111 |
| 4,701,015 A | 10/1987 | Saito et al. ................. 385/109 |
| 4,752,113 A * | 6/1988 | Saito et al. ................. 385/110 |
| 5,621,841 A * | 4/1997 | Field .......................... 385/113 |
| 5,642,452 A * | 6/1997 | Gravely et al. ............. 385/113 |
| 5,684,904 A * | 11/1997 | Bringuier et al. ........... 385/109 |
| 5,689,601 A | 11/1997 | Hager et al. ................ 385/100 |
| 5,838,863 A * | 11/1998 | Fujiura et al. .............. 385/103 |
| 5,905,834 A * | 5/1999 | Anderson et al. ........... 385/111 |
| 6,014,487 A * | 1/2000 | Field et al. ................. 385/110 |

FOREIGN PATENT DOCUMENTS

JP          62-184413          * 8/1987

OTHER PUBLICATIONS

Covert Company Inc., Powder Spray Technologies; Web site information, 1998.

* cited by examiner

Primary Examiner—Rodney Bovernick
Assistant Examiner—Juliana K. Kang
(74) Attorney, Agent, or Firm—Timothy J. Aberle

(57) ABSTRACT

A fiber optic cable (10) having a cable core (20) includes fiber optic cable components in the form of buffer tubes (23), a binder (26), and strength members (31). Cable core (20) includes a series of stripes (38) that comprise a mixture of adhesive and water absorbent substances. The water absorbent substance of stripes (38) is operative to swell and thereby block the flow of water in cable (10). Stripes (38) are made by the sequential coating of the adhesive and the water absorbent substances onto the cable whereby the water absorbent substance is propelled into interstices between the cable components. FIGS. 2 and 4.

12 Claims, 3 Drawing Sheets

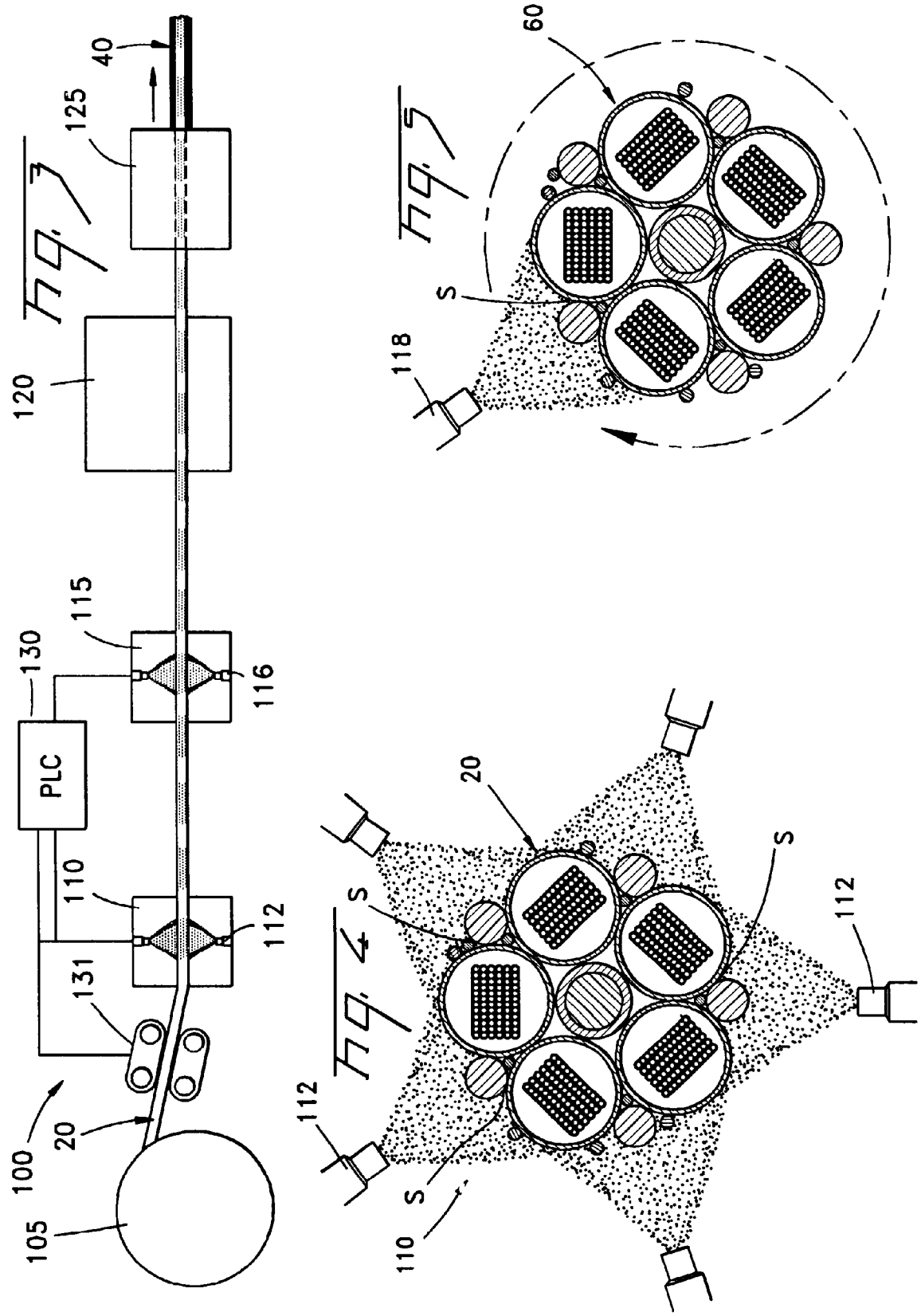

FIBER OPTIC CABLE WITH WATER BLOCKING FEATURES

The present invention relates to fiber optic cables and, more particularly, to water absorbent features of fiber optic cables.

Fiber optic cables include optical fibers which transmit information in cable television, computer, power, and telephone systems. A fiber optic cable may be installed in an environment where the cable is exposed to water. The migration of water in a fiber optic cable is a problem which may occur where the cable jacket has been cut or otherwise breached and water enters the cable. The migration of water in a cable may cause the flooding of a cable passageway or enclosure, and/or it may negatively affect the performance of the optical fibers.

To block the flow of water in a cable, known fiber optic cables may include hardened resin walls, a hard to remove and messy flooding or filling compound, or a more craft-friendly, dry water absorbent chemical. U.S. Pat. No. 4,381,140 discloses a slotted core type fiber optic cable wherein optical fibers are fixed to the slotted core by hardened walls of polyurethane resin that define solid barriers against the migration of water. This solution to the water migration problem is disadvantageous because it makes the cable heavy and stiff. An additional disadvantage is that, upon bending of the cable, stress may flow from the slotted core to the hardened polyurethane and thence to the optical fibers therein, whereby the optical fibers may experience breakage, macrobending, or microbending.

As noted above, flooding or filling compounds may be used to block the flow of water in a fiber optic cable. U.S. Pat. Nos. 4,752,113 and 4,701,015 disclose a messy and hard to remove polybutylene flooding compound or jelly. Loosely applied damp-proof powder is disposed between spaced masses of the jelly. The loose damp-proof powder is intended to be confined between the spaced masses of jelly, thereby solving a stated problem regarding the non-uniform distribution of the loose powder in the cable due to vibration of the cable during transportation or installation of the cable. This solution to the problem of water migration is disadvantageous because the jelly is messy and hard to remove. An additional disadvantage is that the application of loose powder and spaced masses of jelly hinder manufacturing processes and result in high production costs. Moreover, the jelly material is expensive and it makes the cable heavy and difficult to route through cable passageways.

As noted above, a dry water absorbent chemical is more craft-friendly than hardened resin walls or a hard to remove and messy flooding or filling compound. A typical water absorbent chemical includes a polymer chain with reaction sites that react with water, thereby transforming the water absorbent chemical into an expanded mass of viscous gel. The viscous gel acts as a physical barrier to the migration of water. The water absorbent chemical is typically impregnated in a yarn or a non-woven tape along the full length of the yarn or tape. Such water blocking tapes and yarns may be disadvantageous because they may not be effective to block the flow of water in small chinks, gaps, and spaces of interstices within the cable. Additionally, since the cost to produce a fiber optic cable should be minimized, and the use of water absorbent chemicals contributes to the cost of production, the use of such chemicals should be kept to the minimum necessary to meet specifications.

OBJECTS OF THE INVENTION

It is an object of the invention to provide a fiber optic cable comprising a cable core having at least one optical fiber, the cable core including fiber optic cable components that define superficies and interstices of said cable core, at least portions of the fiber optic cable components include at least one water absorbent stripe, the stripe comprising a water absorbent substance for absorbing water and thereby blocking the flow of water in the cable, the stripe coating portions of said cable core.

It is another object of the present invention to provide a fiber optic cable comprising a cable core having at least one optical fiber, the cable core including fiber optic cable components arranged about a longitudinal axis of the cable, the fiber optic cable components defining superficies and interstices of the cable core, portions of the fiber optic cable components include at least one water absorbent stripe, the stripe coating superficies and interstices of the cable core along a generally helical path generally centered about the longitudinal axis of the cable.

It is a further object of the present invention to provide a fiber optic cable comprising a cable core having at least one optical fiber, the cable core including fiber optic cable components arranged about a longitudinal axis of the cable, the fiber optic cable components including respective water absorbent stripes, the fiber optic cable components arranged in the cable core so that respective stripes are transversely aligned with each other, relative to the longitudinal axis, thereby defining water absorbent positions within the cable.

It is an object of the present invention to provide a manufacturing line for the manufacture of at least one fiber optic cable component, the manufacturing line comprising a coating chamber with at least one water absorbent substance nozzle, a fiber optic cable component passing through the chamber adjacent the nozzle, a programmable controller operative to monitor cable component length information via a length sensor, the programmable controller being operative to control the water absorbent substance nozzle to propel the water absorbent substance toward the cable component so that at least portions of the cable component are coated with a water absorbent stripe.

It is another object of the present invention to provide a method of making a fiber optic cable, comprising the steps of monitoring cable component length information, and coating a fiber optic cable component with a stripe comprising a water absorbent substance.

BRIEF DESCRIPTION OF THE DRAWING FIGURES

FIG. 3 is a schematic view of a cable manufacturing line according to the present invention.

FIG. 4 is a schematic view of a coating system of the manufacturing line of FIG. 3.

FIG. 5 is a schematic view of an alternative coating system according to the present invention.

Figure 7:
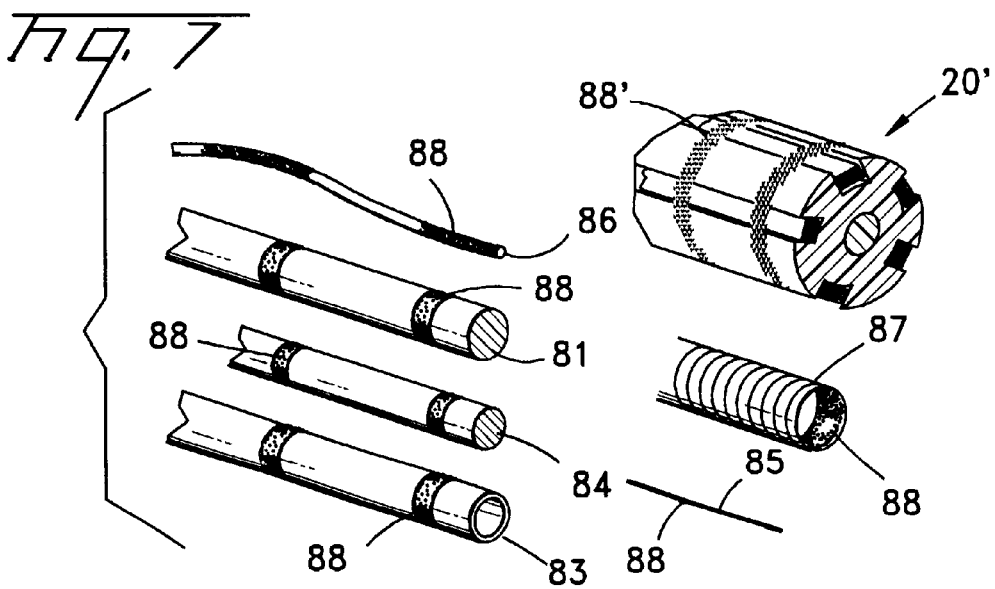

FIG. 7 includes isometric views of fiber optic cable components made according to the present invention.

Figure 8:
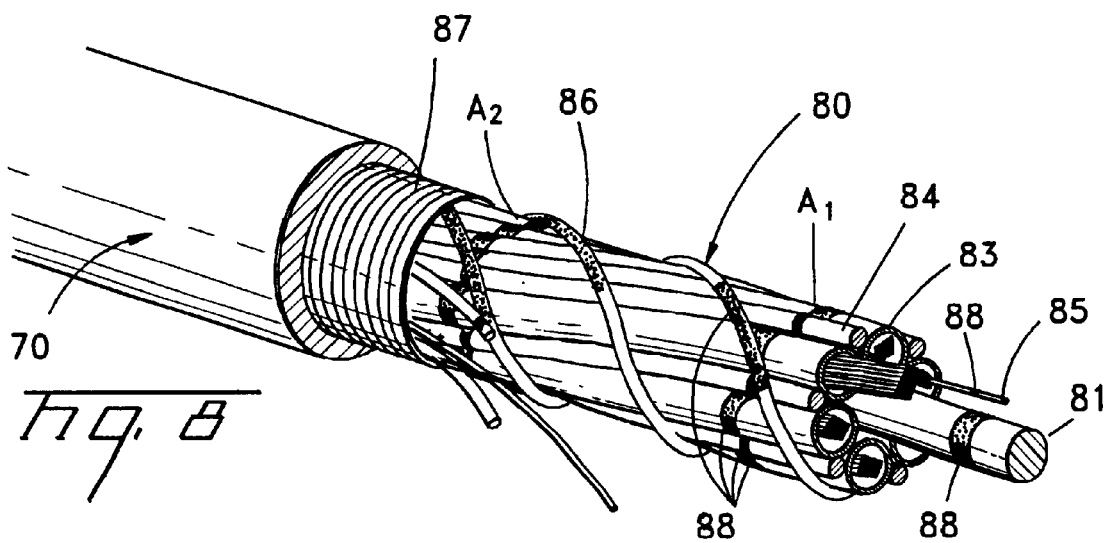

FIG. 8 is an isometric view of a fiber optic cable made with the components of FIG. 7.

DETAILED DESCRIPTION OF THE INVENTION

Figure 1:
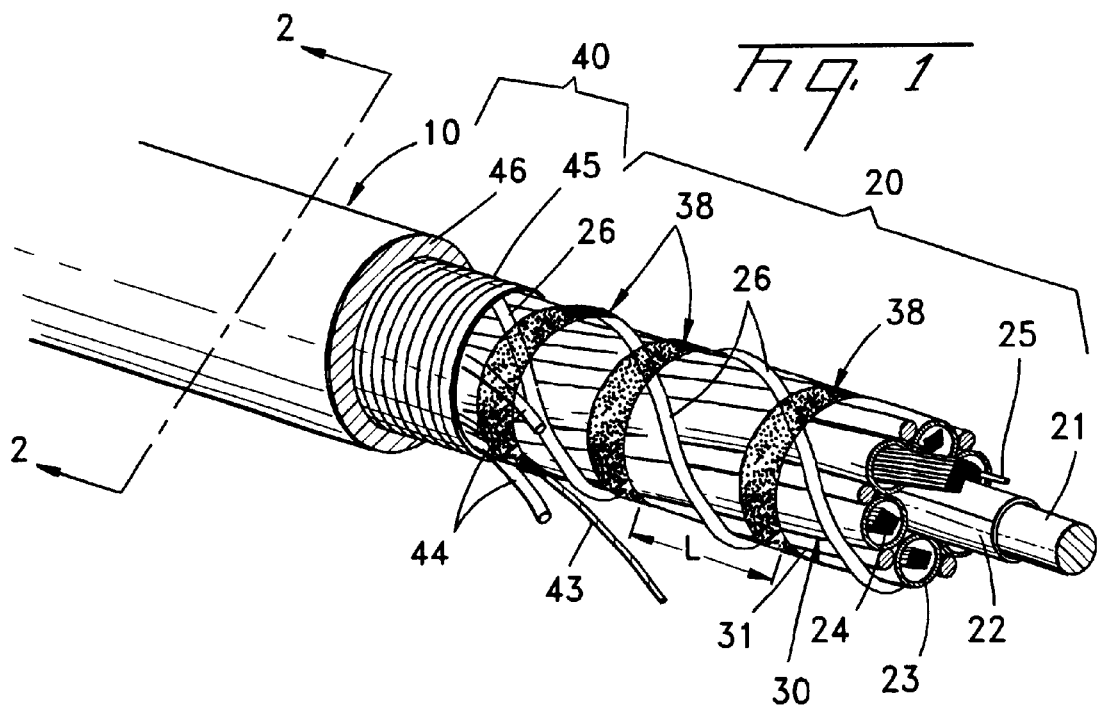
FIG. 1 is an isometric view of a fiber optic cable according to the present invention.
Figure 2:
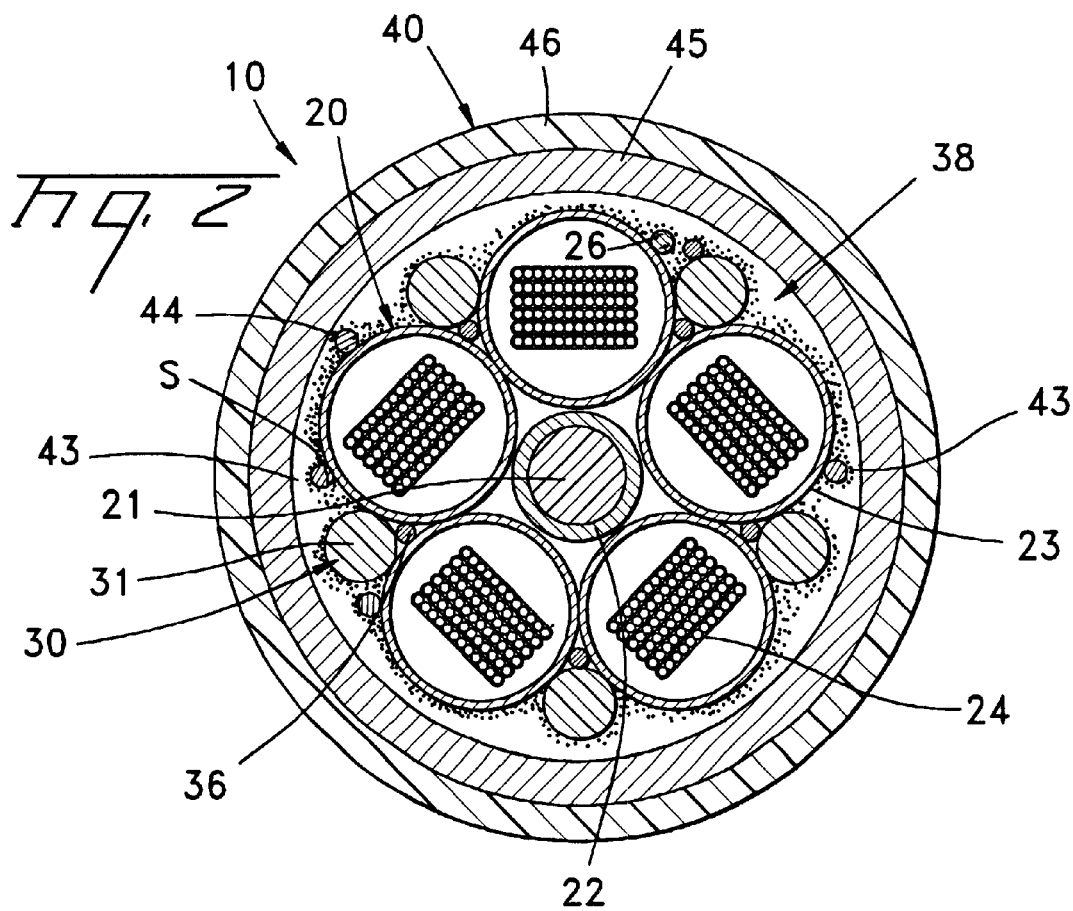
FIG. 2 is a cross section of the fiber optic cable of FIG. 1 taken along line 2—2.

Referring to FIGS. 1–2, a fiber optic cable 10 according to an embodiment of the present invention will be described.

Fiber optic cable 10 includes a cable core 20 and a sheath section 40 that surrounds the core. Cable core 20 includes fiber optic cable components in the form of buffer tubes 23 having a core binder component 26 stranded therearound, and interstitial assemblies 30 disposed in respective interstices S (FIG. 2). Cable core 20 includes a central member 21 formed of a dielectric material that is surrounded by a conventional water swellable tape 22. Buffer tubes 23 surround tape 22, and each buffer tube 23 includes optical fiber ribbons 24 with optical fibers 25 therein. Buffer tubes 23 are preferably S-Z stranded about central member 21 in a conventional S-Z stranding manufacturing process.

As best shown by FIGS. 2–3, each interstitial assembly 30 comprises a cable reinforcing component, for example, a crush-strength component 31. Crush-strength component 31 is formed of, for example, a low or a medium density polyethylene material, or a polypropylene material. Interstitial assemblies 30 include a conventional water swellable member, for example, a commercially available water swellable yarn 36. Water swellable yarn 36 is disposed longitudinally along crush-strength component 31 for water blocking protection between component 31 and adjacent tubes 23.

Sheath section 40 includes two ripcords 43 which are located about 180 degrees apart relative to the center of fiber optic cable 10. Additionally, sheath section 40 includes-tensile strength members 44. An armor tape 45 surrounds ripcord 43 and dielectric strength members 44. A cable jacket 46 surrounds armor tape 45.

According to an embodiment of the present invention, core 20 includes a series of longitudinally spaced, annular, water absorbent stripes 38. Each water absorbent stripe 38 is a composition of water absorbent and adhesive substances that are deposited on at least portions of each of components 23, 26, 31 (FIG. 1). The water absorbent substance is adhered to the surface of the fiber optic cable components with the adhesive substance. Stripes 38 may respectively cover, for example, about 20–40% of sequential intervals L of cable 10 (FIG. 1). The water absorbent substance may be, for example, commercially available potassium polyacrylate particles or sodium polyacrylate particles, as disclosed in U.S. Pat. No. 5,684,904, which patent is incorporated by reference herein in its entirety. The adhesive substance may be a latex binder as disclosed in U.S. Pat. No. 5,689,601, a water soluble or absorptive resin as disclosed in U.S. Pat. No. 5,179,611, or a water soluble hot melt adhesive as disclosed in U.S. Pat. No. 5,649,041, which patents are incorporated by reference herein in their respective entireties. Additionally, the adhesive substance may be an ultraviolet (UV) light curable resin, e.g. a UV curable acrylate material, or a water absorptive plastisol-type material. For enhanced water absorbency, the adhesive may include a gas or a chemical foaming agent as disclosed in U.S. Pat. No. 5,369,720, which patent is incorporated by reference herein. The stripe may include an anti-freezing chemical that is effective to depress the freezing point of water. Anti-freeze chemicals are disclosed in U.S. Pat. Nos. 5,410,629, 5,321,788, and 4,401,366, which patents are incorporated by reference herein.

Referring to FIGS. 3–4, a cable manufacturing line 100 for the manufacture of fiber optic cables with stripes 38 according to the present invention will be described. Cable manufacturing line 100 includes a pay-off 105, an adhesive substance coating chamber 110, and a water absorbent substance coating chamber 115 preferably having a substance recovery/recycling system (not shown). Adhesive substance coating chamber 110 includes conventional adhesive coating type nozzles 112 (FIGS. 3–4) arranged about core 20, and water absorbent substance coating chamber 115 includes conventional powder coating type nozzles 116 (FIG. 3) arranged about core 20. Nozzles 112, 116 are preferably aligned with areas of the core having the highest concentration of interstices. Adhesive and water absorbent substances are, under suitable pressure and temperature conditions, respectively supplied to nozzles 112,116 by conventional substance supply means (not shown). Nozzles suitable for use with the present invention are made commercially available by the COVERT Company and the Nordson Corporation. Suitable substance recovery systems are made available by the Nordson Corporation.

Cable manufacturing line 100 further includes a KEVLAR server 120, a cross head extruder 125, a conventional programmable logic controller (PLC) 130, and a cable length sensor 131. PLC 130 is operative to sequentially activate/deactivate adhesive substance nozzles 112 in chamber 110, and it is operative to sequentially activate/deactivate water absorbent substance nozzles 116 in chamber 115. Additionally, PLC 130 is pre-programmed to activate/deactivate the nozzles in response to cable length information provided by cable length sensor 131.

During the cable manufacturing operation (FIG. 3), cable core 20 is continuously fed from pay-off 105, and the length of the core is monitored by sensor 131 which inputs the cable length information to PLC 130. When the cable length is substantially equal to pre-programmed length values, PLC 130 activates/deactivates valves 112 of adhesive coating chamber 110 (FIG. 4) whereby successive stripes of adhesive are coated on core 20. To form the stripes of adhesive, the adhesive substance is simultaneously propelled from nozzles 112 toward core 20 at a suitably high velocity whereby the adhesive substance is propelled into the chinks, gaps, and spaces of interstices S. In other words, during the coating interval, the adhesive substance coats the superficies of core 20 and penetrates into interstices S, and thereby forms spaced stripes of the adhesive substance about core 20. Next, PLC 130 activates water absorbent substance nozzles 116 when cable length information indicates the movement of the stripes of adhesive into coating chamber 115. As the water absorbent substance is propelled, it impinges upon and sticks to the adhesive-coated superficies and interstices of core 20, thereby forming water absorbent stripes 38 in the form of generally continuous annular bands on core 20. A curing chamber (not shown) with, for example, forced hot air directed towards the cable core may be provided to enhance the curing speed of the adhesive water absorbent substance mixture. Where the adhesive substance comprises a UV curable substance, a UV radiation source is used to cure the mixture.

Figure 6:
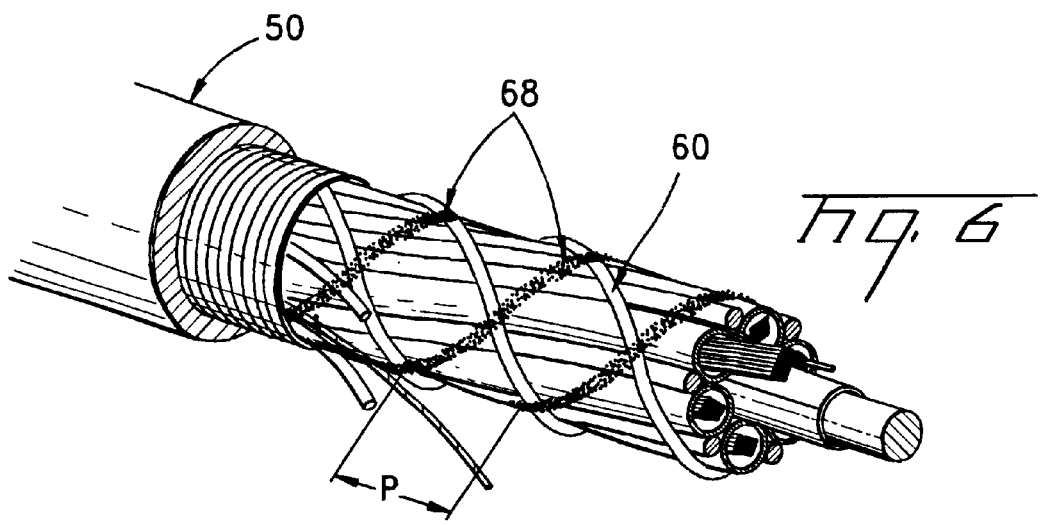
FIG. 6 is an isometric view of a fiber optic cable according to an alternative embodiment of the present invention.

As an alternative to an annular stripe, the present invention may be practiced in the form of a helical stripe. FIG. 6 shows a fiber optic cable 50 having a cable core 60 with a continuous helical stripe 68 disposed thereon. The water absorbent substance may be mixed with an adhesive substance and coated on core 20 with a rotating nozzle 118 (FIG. 5). Where nozzle 118 comprises a conventional mixing nozzle, the mixture is made in the nozzle itself. Alternatively, the mixture may be made in a suitable compounding chamber (not shown) and then fed under suitable pressure and temperature conditions to nozzle 118. PLC 130 is programmable to calculate the speed of core 20, and to control the angular velocity of rotating nozzle 118 to achieve a suitable pitch P. As a further alternative, a gang of conventional mixing nozzles may be used to coat core 20 in one step, thus obviating the need for more than one coating chamber.

According to the foregoing embodiments, the water absorbent and adhesive substances will coat the superficies and penetrate into the interstices of the cores 20, 60 whereby the fiber optic cable components will include a stripe 38, 68 of water absorbent material. The high velocity coating of the substances assures that the substances will penetrate into the chinks, gaps, and spaces of the interstices, i.e., where conventional water absorbent tapes and yarns may not be effective to block the flow of water.

In another embodiment of the present invention, individual cable components may include respective water absorbent stripes 88. FIG. 7 shows fiber optic cable components in the form of a central member 81, a buffer tube 83, a strength member 84, a yarn 85, a binder 86, and an armor tape 87. Each of the components includes a series of water absorbent stripes 88 thereon. Stripes 88 may, for example, be made on the cable components in the manufacturing process described above in respect of cable 10. Cable components 81,83,84,85,86,87 may then be assembled together in a cable manufacturing operation to define a fiber optic cable 70 according to the present invention. Preferably, the manufacturing operation includes length measuring sensors and a PLC operative to collate the length information whereby stripes 88 of the respective components would be aligned in the cable core to form a series of longitudinally spaced water absorbent positions $A_1, A_2, \ldots A_n$. For example, positions $A_1, A_2$ are defined by stripes 88 being aligned in generally the same transverse plane relative to a longitudinal axis of cable 70.

The present invention has thus been described with reference to the foregoing embodiments, which embodiments are intended to be illustrative of the present inventive concepts rather than limiting. Persons of skill in the art will appreciate that variations and modifications of the foregoing embodiments may be made without departing from the scope of the appended claims. For example, although the present invention has been described with reference to fiber optic cable cores of the loose tube type, the invention may be practiced with cores comprising, for example, a monotube or a slotted rod 20' (FIG. 7). A cable core may comprise more, less, or different fiber optic cable components. Additionally, a fiber optic cable according to the present invention may include a water swellable tape or yarn. Furthermore the water absorbent and adhesive substance mixture of the present invention may include a conventional coloring die for the purpose of distinguishing stripes 38,68, 88 from other cable components. Stripes 38,68,88 may be annularly intermittent, or may comprise portions which are longitudinally staggered. Rather than annular stripes, stripes 38,68,88 may be applied longitudinally to the core, in either continuous or intermittent configurations. A substantially annular stripe may be applied along long lengths of the core. Moreover, PLC 130 may be programmed to alternately rotate nozzle 118 in accordance with an S-Z stranding of the buffer tubes, or S-Z slots in a slotted core cable. Additionally, PLC 130 may be programmed to activate/ deactivate nozzle 118 during the rotation thereof so that an intermittent helical stripe 68 is made on the cable core. Application of a stripe according to the present invention may be made before the addition of interstitial assemblies 30, or where assemblies 30 are not part of the core, so that inner interstices of the core, for example, the central member and radially inner surfaces of the buffer tubes, may be coated with the water absorbent material.

Accordingly, what is claimed is:

1. A fiber optic cable, comprising:
   a cable core having at least one optical fiber, said cable core including fiber optic cable components that define superficies and interstices of said cable core, at least portions of said fiber optic cable components forming at least a portion of one water absorbent generally annular stripe on said cable core said stripe defining a coating on at least one of said components having at least one optical fiber therein, said stripe being a coating formed by propelling said coating at said components and curing said coating on exterior surfaces of said components so that said cable core has an intermittent cured coating, and said intermittent coating comprising a water absorbent substance for absorbing water and thereby blocking the flow of water in the cable.

2. The fiber optic cable of claim 1, wherein said stripe is a generally continuous annular band about said cable core.

3. The fiber optic cable of claim 1, wherein said fiber optic cable components include at least one buffer tube and a strength member, and said water absorbent stripe at least partially covers said at least one buffer tube and said strength member.

4. The fiber optic cable of claim 3, wherein said water absorbent stripe at least partially covers a core binder of said cable core.

5. The fiber optic cable of claim 1, wherein said water absorbent substance is attached to said fiber optic components with an adhesive substance selected from the group consisting of a latex binder, a water soluble resin, a water absorptive resin, a water soluble hot melt adhesive and a UV curable resin.

6. The fiber optic cable of claim 1, wherein said water absorbent stripe includes a foaming agent.

7. The fiber optic cable of claim 1, wherein said water absorbent stripe includes an anti-freezing chemical.

8. The fiber optic cable of claim 1, wherein one of said fiber optic cable components comprises a slotted rod.

9. A fiber optic cable, comprising:
   a cable core having at least one optical fiber, said cable core including fiber optic cable components arranged about a longitudinal axis of said cable, said fiber optic cable components defining superficies and interstices of said cable core, portions of said fiber optic cable components forming at least one water absorbent stripe coating a portion of said cable core, said stripe coating comprising a coating formed by propelling at least one water absorbent substance on said components and curing said coating on exterior surfaces of said components so that said fiber optic cable components have an intermittent cured coating, said stripe coating of said cable core being disposed along a generally helical path generally centered about said longitudinal axis of said cable.

10. The fiber optic cable of claim 9, wherein said water absorbent substance is attached to said fiber optic components with an adhesive substance selected from the group consisting of a latex binder, a water soluble resin, a water absorptive resin, a water soluble hot melt adhesive, and a UV curable resin.

11. A fiber optic cable, comprising:
   a cable core having at least one optical fiber, said cable core including fiber optic cable components arranged about a longitudinal axis of said cable, said fiber optic cable components including respective water absorbent stripes, said stripes comprising a coating formed by propelling at least one water absorbent substance on said components and curing said coating on exterior surfaces of said components so that said fiber optic cable components have at least a portion of their respective surfaces containing said cured coating, said fiber optic cable components arranged in said cable core so that respective said stripes are generally transversely aligned with each other, relative to said longitudinal axis, thereby defining water absorbent positions within said cable.

12. The fiber optic cable of claim 11, wherein said water absorbent substance is attached to said fiber optic components with an adhesive substance selected from the group consisting of a latex binder, a water soluble resin, a water absorptive resin, a water soluble hot melt adhesive, and a UV curable resin.

* * * * *